United States Patent [19]

Morgan, Jr.

[11] Patent Number: 5,376,271
[45] Date of Patent: Dec. 27, 1994

[54] LIQUID FILTRATION UNIT

[76] Inventor: H. William Morgan, Jr., P.O. Box 735, Michigan City, Ind. 46360

[21] Appl. No.: 219,855

[22] Filed: Mar. 30, 1994

Related U.S. Application Data

[63] Continuation of Ser. No. 38,859, Mar. 29, 1993, abandoned.

[51] Int. Cl.⁵ .................................... B01D 29/27
[52] U.S. Cl. ........................... 210/450; 210/452; 210/453
[58] Field of Search ............... 210/232, 238, 450, 451, 210/452, 453, 455

[56] References Cited

U.S. PATENT DOCUMENTS

| | | | |
|---|---|---|---|
| 3,640,392 | 2/1972 | Smith et al. | 210/453 |
| 4,259,188 | 3/1981 | Morgan | 210/451 |
| 4,419,240 | 12/1983 | Rosaer | 210/470 |
| 4,701,259 | 10/1987 | Rosaen | 210/452 |
| 4,818,398 | 4/1989 | Lott et al. | 210/452 |
| 4,948,504 | 8/1990 | Keerdorf et al. | 210/470 |
| 5,137,632 | 8/1992 | Morgan, Jr. | 210/452 |
| 5,192,424 | 3/1993 | Beyne et al. | 210/453 |

Primary Examiner—Robert A. Dawson
Assistant Examiner—W. L. Walker
Attorney, Agent, or Firm—James D. Hall

[57] ABSTRACT

A liquid filtration system which includes a filter vessel having a liquid inlet and an outlet. A filter basket Is positioned in the vessel between the inlet and outlet and a filter bag is mounted on the filter basket. The bag includes a mounting ring which seats against the basket and against a smooth inner side wall of the vessel to prevent fluid leakage.

4 Claims, 3 Drawing Sheets

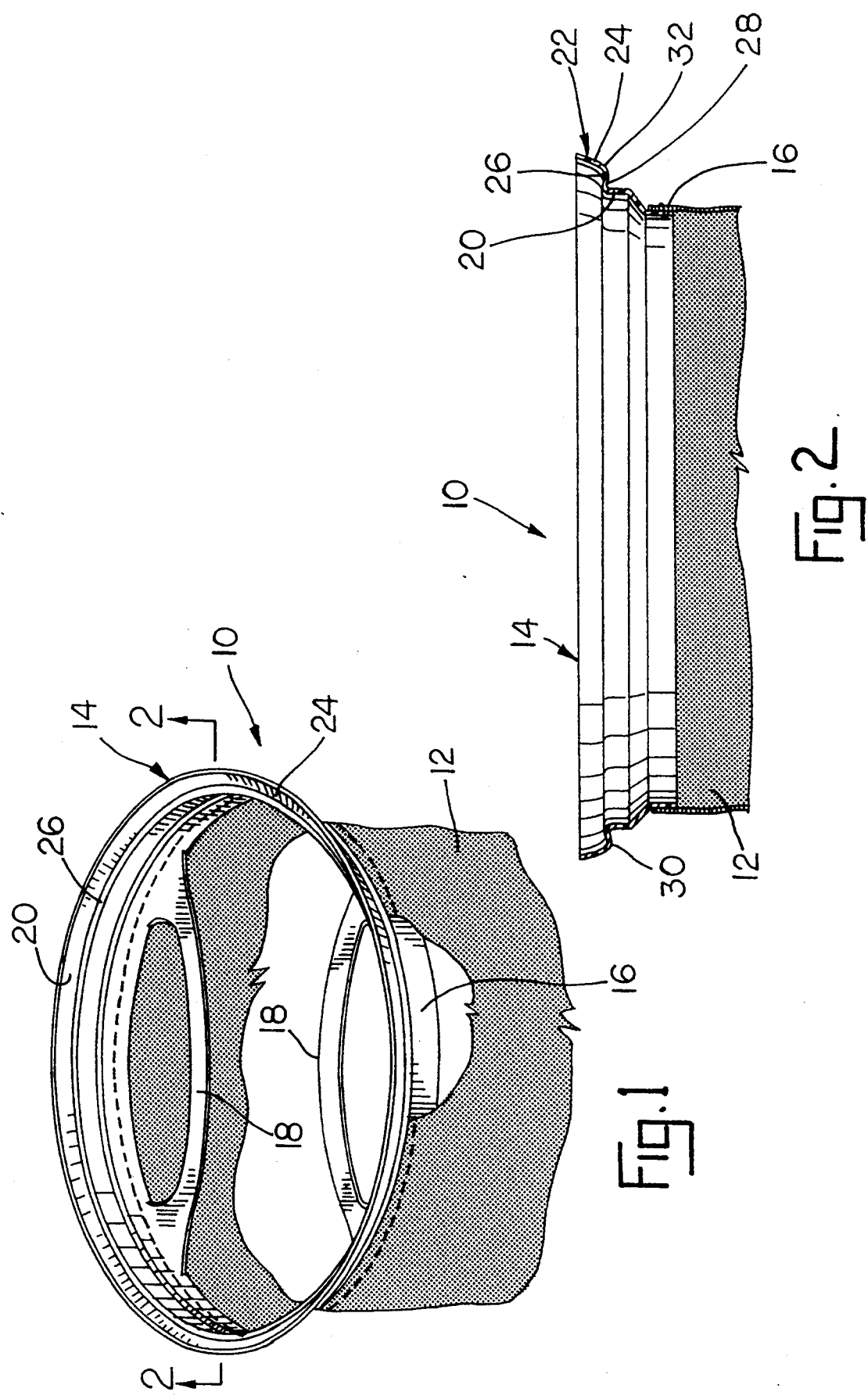

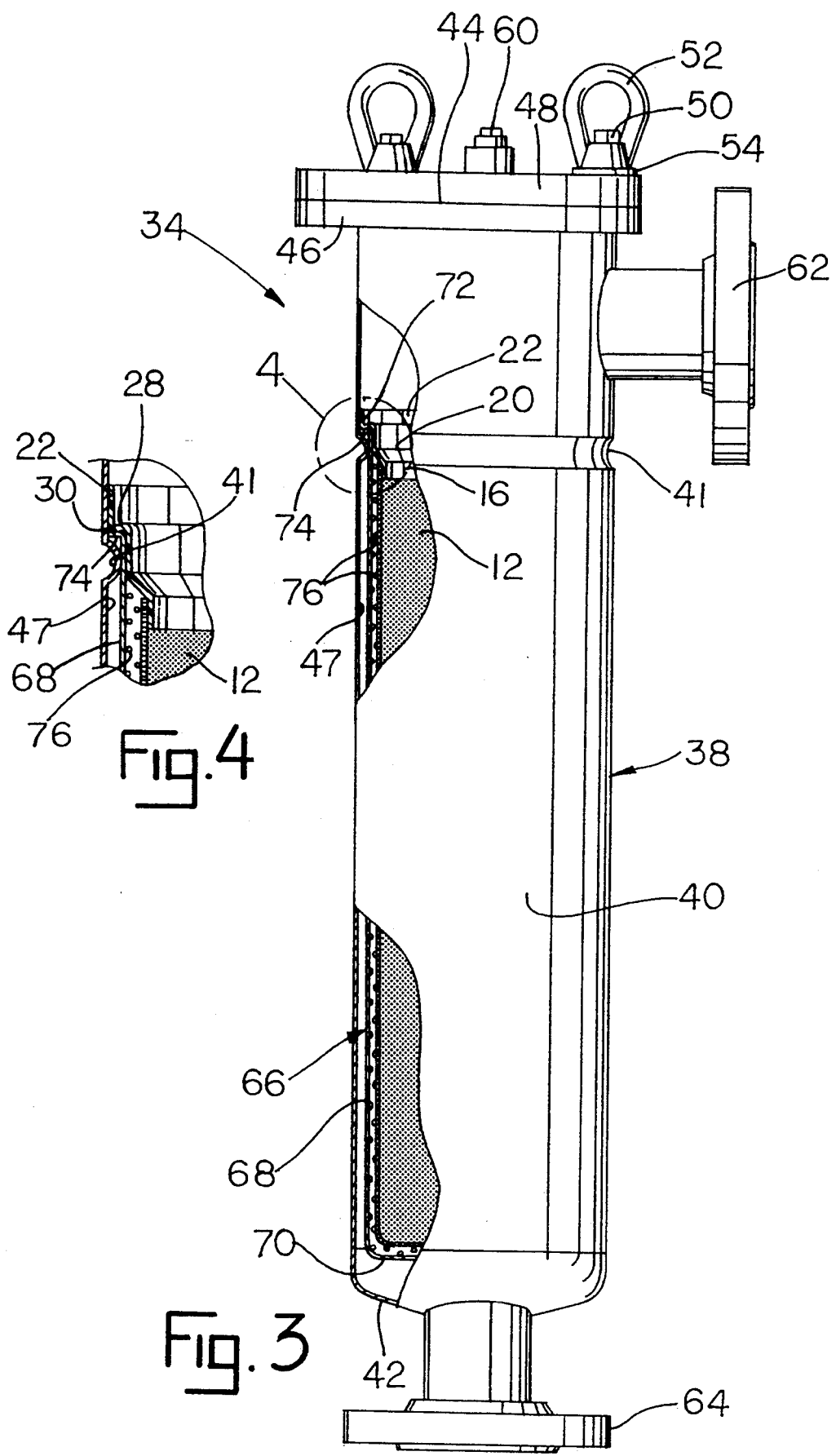

LIQUID FILTRATION UNIT

This is a continuation of copending application(s) Ser. No. 08/038,859 filed on Mar. 29, 1993, now abandoned.

SUMMARY OF THE INVENTION

This invention relates to liquid filters and will have application to liquid filters which utilize removable filter bags.

Liquid filters which utilize removable baskets and bags are common industrial items. In a typical filter of this type, the basket is seated inside the filter vessel and the bag lays in the basket. The bag typically includes a mounting ring which has a projecting flange that seats against an inner shoulder which protrudes from the vessel side wall. Most such filters utilize the removable cap to smash this flange against the shoulder and create a seal to prevent liquid leakage during operation.

The filter vessel and filtration bag/basket combination of this invention eliminate the inner projecting shoulder and provide for a filtration system which is very easy to repair and maintain. The vessel has a smooth inner surface. The bag includes a mounting ring which has a recess for seating against the upper flange of the basket. A flange projects outwardly from the ring and seats against the smooth side surface of the vessel to seal against leakage. Since bags are replaced frequently, the elimination of the shoulder will save down time during bag replacement and will also render the vessel easier to clean.

It is an object of this invention to provide for a liquid filtration unit which is easy to clean and maintain.

Another object is to provide for a liquid filter which effectively seals against fluid leakage during operation.

Another object is to provide for a novel and improved filter vessel to be used in conjunction with a basket and a replaceable filter bag.

Other objects will become apparent upon a reading of the following description.

BRIEF DESCRIPTION OF THE DRAWINGS

A preferred embodiment of the invention has been depicted for illustrative purposes only wherein:

FIG. 1 is a fragmented perspective view of a filter bag showing a mounting top as constructed according to the principles of this invention.

FIG. 2 is a sectional view taken along line 2—2 of FIG. 1.

FIG. 3 is an elevation view of a filter vessel with portions cut away to illustrate the filter bag and basket in use.

FIG. 4 is a detail view of the area with broken circle 4 of FIG. 3.

DESCRIPTION OF THE PREFERRED EMBODIMENT

Figure 6:
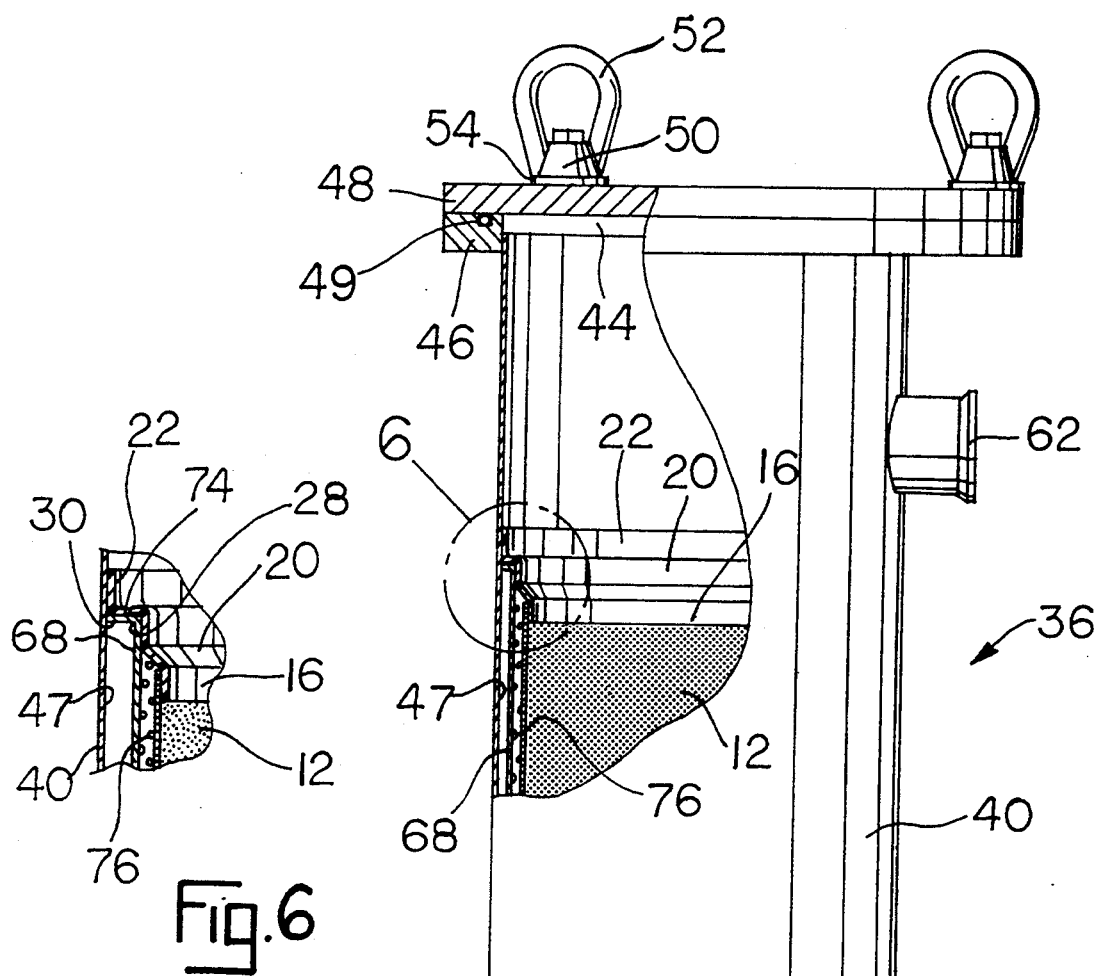
FIG. 6 is a detail view of the area within broken circle 6 of FIG. 5.

The preferred embodiment herein described is not intended to be exhaustive or to limit the invention to the precise form disclosed. It is chosen and described to explain the principles of the invention and its application and practical use to enable others skilled in the art to utilize its teachings.

Referring first to FIGS. 1 and 2, reference numeral 10 generally designates the filter bag which forms the subject matter of this invention. Filter bag 10 includes a generally closed cylindrical bag member 12 which is formed of a liquid pervious material, such as cloth, spun or woven synthetic fibers, or similar materials well known in the art.

Bag 10 also includes mounting top 14 which is formed of a liquid impervious material such as molded polyethylene or the like. Top 14 as shown is generally annular in configuration and includes a base ring portion 16. Bag member 12 is fastened to top 14 at ring portion 16 in a conventional manner such as tacking or gluing. One or more handle portions 18 extend across ring portion 16 as shown.

Top 14 also includes stepped side wall 20 which extends upwardly and outwardly from ring portion 16. A sealing ring portion 22 extends upwardly and outwardly of side wall 20. Sealing ring portion 22 is defined by upper side wall 24 which is preferably flared outwardly as shown and lower wall 26 which defines a circumferential recess 28. Circumferential lead 30 may be formed on lower wall 26 and positioned as shown. Upper side wall 24 may also include a lower bevelled portion 32 which connects the upper side wall to bead 30. Top 14 as described is preferably molded in a single piece.

FIGS. 3 and 4 illustrate bag 12 in use with a filter vessel constructed according to the principles of this invention. FIG. 3 illustrates bag 12 in use with a first embodiment of filter vessel 34 and FIG. 4 illustrates bag 12 in use with a modified vessel 36.

Filter vessel 34 includes a generally closed cylindrical housing 38 defined by continuous side wall 40, bottom wall 42 and an open top wall 44 which has a top mounting flange 46. Housing 38 as constructed defines inner filter chamber 47. A cover 48 is positioned over top wall 44 to close vessel 34. Cover 34 is removably secured to top flange 46 as by eye bolts 50, eye nuts 52, washers 54, clevis pins and cotter pins (not shown). Plug vent 60 and handle (not shown) are carried by cover 48 as shown. Cover 48 and its associated fasteners and parts are well-known in the art. A gasket 49 may be disposed between cover 48 and mounting flange 46 to prevent fluid leakage.

Inlet port 62 is located in housing side wall 40 and serves to admit liquid to be filtered into filter chamber 47. Outlet port 64 is located in housing bottom wall 42 and serves to provide an egress for filtered liquid from filter chamber 47. Side wall 40 preferably has a continuous crimped portion 41 as shown.

Filter basket 66 is positioned in filter chamber 47 as shown. Basket 66 is of common construction and is generally formed of metal, such as stainless steel or aluminum. Basket 66 includes a generally cylindrical side wall 68 and a flat bottom wall 70 and is open at the top 72 which defines an outer circumferential lip 74. Side wall 68 is preferably perforated to include a plurality of holes 76 to allow filtered liquid to pass through to outlet port 64.

Filter bag 10 and filter vessel 34 are operated to filter various liquids in the following manner. Cover 48 is first removed and filter basket 66 inserted into filter chamber 47 with its lip 74 supported on crimped portion 41 forming an annular projection. Bag 10 is then inserted into filter chamber 47 with the bag member positioned within basket 66. Mounting top 14 is preferably formed with the outer diameter of flared upper side wall 24 slightly greater than the inner diameter of housing side wall 40. Thus formed, upper side wall 24 flexes to a flush fit with the housing side wall 40 to seal against leakage of fluid around the side of bag member 12 and basket 66. Top 14 seats against basket top 72 at recess 28. Cover 48 is closed and secured.

In operation, bag member 12 is spaced from basket side wall 68 by virtue of stepped side wall 20 of mounting top 14. Fluid to be filtered flows in through inlet port 62 and is directed by housing side wall 40 and top 14 into bag member 12 which filters solid impurities larger than the pore openings in the bag member. The filtered liquid flows out of bag member 12 and through holes 76 in basket 66 to outlet port 64 where it exits vessel 34.

Bag 10 must be periodically replaced and basket 66 and vessel 34 cleaned to ensure efficient filtration. Cover 48 is removed and a user grasps bag 10 by handles 18 to remove the bag which is discarded. Basket 66 may be removed if desired usually by pulling on a handle (not shown). Vessel 34 may then be rinsed clean by conventional methods. Reinsertion of the new bag 10 and basket 66 is as above described.

Figure 5:
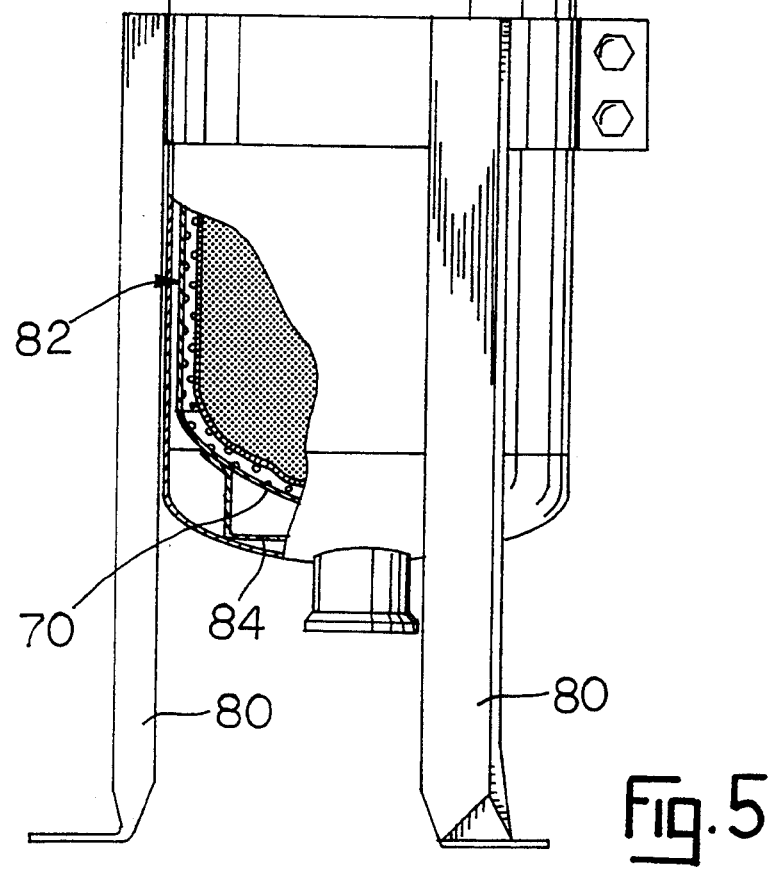
FIG. 5 is an elevation view of a modified filter vessel and a modified basket with portions of the vessel cut away to illustrate the basket and bag in use.

FIG. 5 illustrates a modified filter vessel 36 which includes support legs 80 connected to housing 38 which allow the vessel to support itself in an upright orientation. Vessel 36 includes no crimped portion 41 and is adapted to work with a modified basket 82 which includes support legs 84 that rest on housing bottom wall 42. Otherwise, each of the component parts of bag 10, vessel 36 and basket 82 function identically with those described above. As such, similar numbers are used throughout FIG. 5 to identify parts common to both vessels 34, 36 and a second description of these parts will not be presented in the interests of clarity. The insertion and removal of bag 10 and basket 82 is also identical to the methods above described.

It is understood that the above description does not limit the invention to the details given, but may be modified within the scope of the following claims.

I claim:

1. In a liquid filter including a closed filter vessel having a side wall, a bottom wall and an inlet port and an outlet port, a basket positioned in said vessel between said inlet port and said outlet port, means for supporting said basket in a generally fixed position within said vessel, and a filter bag positioned in said vessel between said inlet port and outlet port, the improvement wherein said vessel side wall is substantially smooth but for an internal annular projection, said basket including an upper lip abutting against and supported by said annular projection, said filter bag including a mounting ring attached thereto, said mounting ring including a shoulder means for seating against a lip of said basket adjacent said smooth side wall, said mounting ring further including a flange projecting from said shoulder means for contracting said vessel smooth side wall whereby said mounting ring constitutes seal means for preventing fluid leakage between said side wall and said bag.

2. The liquid filter of claim 1 wherein said vessel defines a top opening, a removable cap attached to said vessel for sealing said top opening.

3. In a liquid filter including a closed filter vessel having a side wall, a bottom wall and an inlet port and an outlet port, a basket positioned in said vessel between said inlet port and said outlet port, means for supporting said basket in a generally fixed position within said vessel by contact of said basket with said vessel bottom wall, and a filter bag positioned in said vessel between said inlet port and outlet port, the improvement wherein said vessel side wall is substantially smooth said filter bag including a mounting ring attached thereto, said mounting ring including a shoulder means for seating against a lip of said basket adjacent said smooth side wall, said mounting ring further including a flange projecting from said shoulder means for contracting said vessel smooth side wall whereby said mounting ring constitutes seal means for preventing fluid leakage between said side wall and said bag, said mounting ring flange being flared outwardly and upwardly from said shoulder means.

4. In a liquid filter including a closed filter vessel having a side wall, a bottom wall and an inlet port and an outlet port, a basket positioned in said vessel between said inlet port and said outlet port, means for supporting said basket in a generally fixed position within said vessel by contact of said basket with said vessel bottom wall, and a filter bag positioned in said vessel between said inlet port and outlet port, the improvement wherein said vessel side wall is substantially smooth said filter bag including a mounting ring attached thereto, said mounting ring including a shoulder means for seating against a lip of said basket adjacent said smooth side wall, said mounting ring further including a flange projecting from said shoulder means for contracting said vessel smooth side wall whereby said mounting ring constitutes seal means for preventing fluid leakage between said side wall and said bag, said shoulder means defining a recess and an outer bead, said basket flange fitted in said recess adjacent said bead.

* * * * *

(12) EX PARTE REEXAMINATION CERTIFICATE (5021st)
United States Patent
Morgan, Jr.

(10) Number: US 5,376,271 C1
(45) Certificate Issued: Nov. 23, 2004

(54) LIQUID FILTRATION UNIT

(76) Inventor: H. William Morgan, Jr., P.O. Box 735, Michigan City, IN (US) 46360

Reexamination Request:
No. 90/005,807, Aug. 28, 2000

Reexamination Certificate for:
Patent No.: 5,376,271
Issued: Dec. 27, 1994
Appl. No.: 08/219,855
Filed: Mar. 30, 1994

Related U.S. Application Data

(63) Continuation of application No. 08/038,859, filed on Mar. 29, 1993, now abandoned.

(51) Int. Cl.[7] .................. B01D 29/27; B01D 35/34
(52) U.S. Cl. .................. 210/450; 210/452; 210/455; 210/477; 210/482; 210/484; 210/489; 210/495; 210/453
(58) Field of Search .................. 210/232, 238, 210/315, 337, 338, 339, 342, 450, 451, 452, 453, 455, 477, 495, 317, 482, 484, 489; 55/377, 378

(56) References Cited

U.S. PATENT DOCUMENTS

| | | | | | |
|---|---|---|---|---|---|
| 3,513,500 | A | * | 5/1970 | Hori | 15/344 |
| 3,631,987 | A | * | 1/1972 | Cattano | 210/452 |
| 3,931,015 | A | * | 1/1976 | Jenkins | 210/232 |
| 4,133,769 | A | * | 1/1979 | Morgan | 210/455 |
| 4,209,875 | A | * | 7/1980 | Pugh et al. | 15/344 |
| 4,285,814 | A | * | 8/1981 | Morgan | 210/315 |
| 4,419,240 | A | * | 12/1983 | Rosaen | 210/444 |
| 4,701,259 | A | * | 10/1987 | Rosaen | 210/450 |
| 5,075,004 | A | * | 12/1991 | Gershenson et al. | 210/445 |
| 5,137,632 | A | * | 8/1992 | Morgan | 210/445 |

* cited by examiner

*Primary Examiner*—Matthew O. Savage

(57) ABSTRACT

A liquid filtration system which includes a filter vessel having a liquid inlet and an outlet. A filter basket Is positioned in the vessel between the inlet and outlet and a filter bag is mounted on the filter basket. The bag includes a mounting ring which seats against the basket and against a smooth inner side wall of the vessel to prevent fluid leakage.

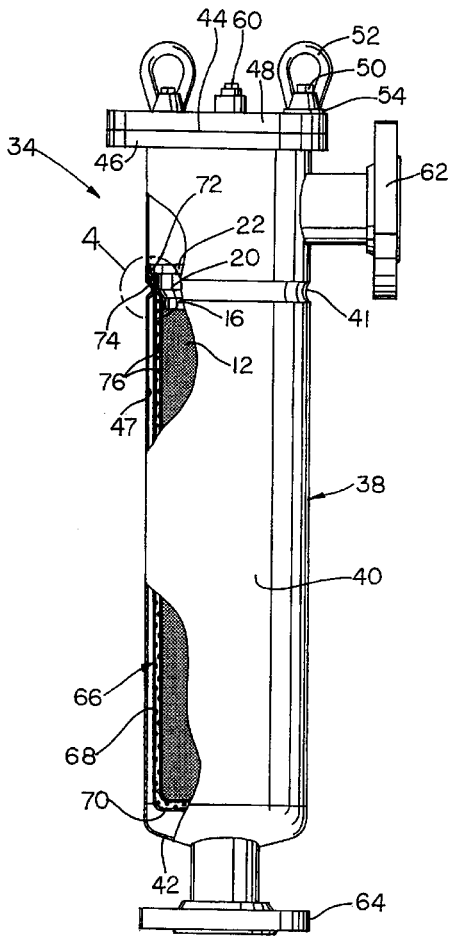

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

\* \* \* \* \*